March 12, 1957

A. C. LANTERI 2,785,089

CORROSION PREVENTION

Filed March 23, 1954

United States Patent Office 2,785,089
Patented Mar. 12, 1957

2,785,089
CORROSION PREVENTION

Albert C. Lanteri, New York, N. Y., assignor to The Texas Company, New York, N. Y., a corporation of Delaware Application March 23, 1954, Serial No. 418,237

7 Claims. (Cl. 117—97)

The present invention relates to protecting metal bodies against corrosion, especially the inner surfaces of tanks and vessels. More particularly, it is concerned with applying and maintaining an adherent protective coating to the interior surfaces of ballast tanks and the like formed of ferrous materials and subjected to the corrosive effect of air and water, particularly salt water. Other tanks which may be protected by the invention are coffer dams, bilges, voids, rudders, dry docks, and fire tower water tanks.

This application is a continuation-in-part of my application Serial No. 275,853, filed March 10, 1952, and now abandoned.

In accordance with the present invention, an effective rust preventive coating is applied to the interior walls of the vessel, tank or container by introducing a fluent composition comprising a relatively viscous petroleum residuum from a naphthene base crude oil (formerly known as an asphaltic crude), a relatively fluid light petroleum oil, and a surface active agent effective to increase the adhesivitiy of the composition to solid surfaces. The composition is floated upon the surface of a body of water as a uniform layer of substantial thickness and the water level is thereafter progressively altered, leaving a uniform protective coating strongly adhering to the walls of the vessel.

Figure 1:
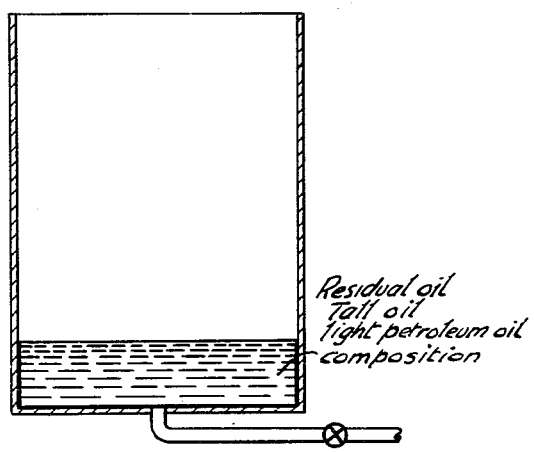
Figure 2:
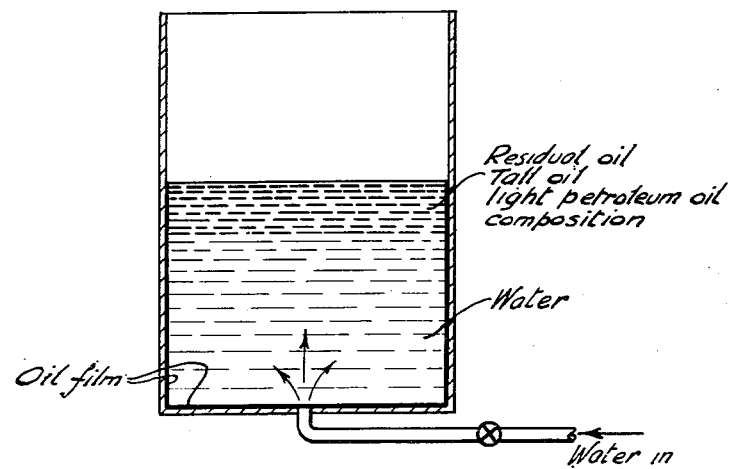

For example, the composition is placed in the bottom of a tank, and thereafter water is introduced below the composition to form a floating surface layer. The water level is continually raised by pumping additional water into the lower part of the tank. As the water rises upwardly, the composition continues to float on the upper surface as a uniform, unbroken layer, which, at its margins, makes uniform contact with the interior surfaces of the vessel, merging therewith and leaving a continuous, uniform and highly adherent film. Alternatively, the tank may be filled with water, the surface layer of composition introduced, and the water thereafter drained to effect surface coating. One embodiment of the invention is shown by the drawing. Figure 1 illustrates a tank with a layer of the corrosion inhibiting composition on the bottom of the tank. Figure 2 illustrates the same tank after water has been introduced to raise the level of the corrosion inhibiting composition and to coat the sides of the tank.

It is believed surprising that even in the presence of moisture, the fluent coating material repels the surface moisture and bonds with the interior surfaces of the vessel to form a substantial, highly adhesive film which remains continuously in place in spite of repeated draining and refilling of the tank and violent agitation of its contents. Since contact of water or atmosphere with the ferrous surfaces is effectively prevented by the resultant coating, the objectionable rusting or corrosion which otherwise takes place in vessels of this character is effectively overcome.

The floating procedure of the present invention is of particular advantage from the standpoint of obviating the high cost and difficulty of applying a rust-preventive coating to the interior of a tank. The complex interior structure of ship ballast tanks, for example, made former manual procedures economically undesirable because staging had to be built for men to work on. Moreover, it has been proven to be difficult by such manual means to obtain a uniform coating over the entire interior surface, even where these surfaces are first prepared by chipping or sand blasting, because of obstructions which hinder the workers. Accordingly, exposed spots, cracks or thin areas tend to initiate points of rapid corrosion.

The present invention is based upon the discovery that the present protective coating material is inherently adapted to deposit a uniform adherent coating from a fluent surface layer or film floating upon a body of water. This is particularly surprising inasmuch as typical liquid coating materials fail to exhibit the necessary water repellency and preferential wetting properties necessary for application to metal surfaces in this manner and even where there is some surface adherence, fail to provide the necessary depth and uniformity of coating. In direct contrast, the coating composition contemplated in accordance with the present invention, as above indicated, adheres tenaciously even to relatively damp and unprepared surfaces in a layer which inherently assumes a substantial and uniform effective thickness, and is resistant to removal or penetration by washing, agitation or repeated wetting and drying.

As above indicated, the invention is particularly advantageous in the case of ship ballast tanks wherein substantial agitation of water in the tanks is frequently encountered. A small residual quantity of coating material may be permitted to remain on the surface of the water within the tank or relatively small amounts may be added periodically prior to discharging or taking on ballast, to render the protection a permanent one. This follows from the fact that the thickness of the coating is inherently determined by the properties of the coating material and, therefore, remains at the proper value in spite of repeated application in the manner contemplated.

The fluent coating composition, in accordance with the present invention, comprises a straight run residuum from a naphthene base type of crude oil, as, for example, a high viscosity residual oil having a Saybolt-Furol viscosity of 40–55 seconds at 210° F. Desirably this residuum constitutes 25–40% of the composition by volume. The residuum, per se, is ordinarily too viscous to flow readily over the surface of a body of water and, therefore, it is cut or thinned to the desired fluency with a suitable petroleum stock which is miscible with the residuum to form a homogeneous solution.

For the present purposes, a composition is preferred having a Saybolt-Furol viscosity in the range of about 25–50 seconds at 122° F. In this range of fluency the liquid will spread uniformly across the surface of the water making good contact with confining surfaces at its margins. A narrower preferred range of viscosity for the composition is about 30–40 seconds on the same basis of determination.

In preparing such a composition the residuum may be cut back to the desired viscosity with a light lubricating distillate such as one having a Saybolt-Universal viscosity of 100–175 seconds at 100° F., for example 100 seconds. In general the heavy residuum may be cut back with any lighter, liquid petroleum oil capable of lowering the viscosity of the resulting mixture to the desired range indicated above. Advantageously middle distillates are selected having a flash point above about 350° F. to avoid fire hazard. The light petroleum oil desirably constitutes 55–70% of the composition by volume.

The adhesivity increasing agent preferred in accordance with the present invention comprises tall oil as, for example crude tall oil, obtainable under the trade name Liqro. The tall oil is in effect a surface active agent which dissolves in the residuum and oil and substantially increases the adhesivity of the residuum for ferrous surfaces. Actually, the increase in adhesivity of the residuum is such as to confer a wetting power higher than that of water. As a result, the highly adhesive coating material actually displaces surface moisture and substitutes therefor on the tank surfaces, forming a preferential and essentially permanent bond.

Moreover, such coatings actually penetrate or strike through rust, slime or similar surface debris even in the presence of moisture. This action is apparently enhanced by the presence of the lighter cutback stock, but, in any event, the result is important from the standpoint of obviating the costly surface preparation usually required.

In its broadest aspect the invention contemplates substituting for the preferred tall oil additive other materials coming within the class of surface active agents which are effective to increase the adhesivity of petroleum residua to solid surfaces and correspondingly promote water repellency. Actually, the agents contemplated herein confer upon the coating material an adhesivity for metal surfaces which is in excess of that of water. This class of agents has previously been recognized in the preparation of mineral-bituminous aggregates for the preparation of bituminous pavements. It includes, for example, condensation products of a diamine with alkyl or alkenyl substituted succinic or succinamic acids, anhydrides or acid esters thereof as disclosed in U. S. Patent No. 2,482,586. In this class are also found the water-insoluble polyamines obtained by hydrogenating the condensation product of an alpha-beta unsaturated aldehyde and ammonia or an amine as disclosed in U. S. Patent No. 2,520,720. Also, mention is made of the use of combinations of sulfur with an oleophilic aliphatic monoamine as disclosed in U. S. Patent No. 2,478,162.

It has also been discovered that a number of additional agents are specifically effective as surface active agents to increase the adhesivity of the residuum and confer water repellency. Among these are petroleum calcium sulfonate which is the calcium salt of sulfonated liquid petroleum fractions. Also may be mentioned the relatively long chain aliphatic nitriles as for example octadecane nitrile known commercially as Armeen T.

In general these surface active agents are effective in proportions of from about 1–5% by volume of the composition, and preferably about 3–5%. Higher percentages are not disadvantageous but are unnecessary to confer adequate adhesivity and therefore are uneconomic.

Following is one specific example of the present invention as applied to a starboard ballast tank of an ore vessel having a width of about 14 feet, a length of about 50 feet, about 50 feet deep and having a capacity of about 1,050 tons ballast water. The interior of the tank was in typical condition of a ship ballast tank after an extensive period of service, with extensively rusted, silted and slime coated surfaces.

For the treatment of this tank a coating composition was made up as follows: 33.3 volumes of a 42–45 second Saybolt-Furol viscosity at 210° F. straight run residuum produced from a naphthene base crude was cut with 63.8 volumes of a non-refined distillate having a Saybolt-Universal viscosity of 125–145 seconds at 100° F. The mixture was completed by incorporating 2.9 volumes of crude tall oil. The resulting mixture had a Saybolt-Furol viscosity of between 30 and 40 seconds at 122° F. and comprised a sticky, greenish-brown, highly adhesive but readily fluent liquid material. Its specific gravity was about 0.9421 at 60° F. compared with water at the same temperature.

About 300 gallons of the coating oil was pumped into the bottom of the tank and permitted to spread about. Water was then introduced into the bottom of the tank below the layer of coating material to cover the bottom and the coating material was permitted to form a uniform layer over the upper liquid surface, merging at its margins with the upstanding walls of the tank.

The rate of water introduction proceeded slowly at first to avoid disruption of the floating layer and thereafter the rate of inflow was set at a convenient rate to fill the tank.

The result of this treatment was an unbroken, apparently uniform coating over the interior walls of the ballast tank contacted by the floating layer, and by completely filling the tank or by suitably agitating the contained water, over the entire interior surface.

After approximately five months of continuous service the coating remained uniformly adherent to the interior surfaces of the tank, indicating a phenomenal adhesive affinity or bonding effect for the metal surfaces. It has been observed that the tall oil has a phenomenal affinity for ferrous metals, such as iron and steel, and that it tends to migrate thru the oily carrier and attach or "plate" itself against the ferrous surfaces.

In order to evaluate further the rust and corrosion protection afforded by the above composition when applied to wet or dry metal surfaces the following test was made. Six identical steel panels were sandblasted clean and weighed. Two of the panels were given two dips through a one quarter inch layer of composition floating on the surface of a container of synthetic sea water. Two more of the panels were first wet thoroughly with synthetic sea water and then the composition was applied in the same way as on the first two panels. The remaining two panels were used as blanks; one was left dry and the other was wet with synthetic sea water. All six panels were hung outside in the open air for one month.

After the one month's exposure all of the panels were washed in precipitation naphtha and acetone to remove the composition and water. The panels were then dipped in a saturated solution of oxalic acid to remove any loose rust, rinsed in plain water, dried in an oven at 250° F. and weighed. No effort was made to remove the rust mechanically. Table I shows the change in appearance of the panels as the test progressed and also the weight changes after one month's exposure. It is evident that good protection against rust and corrosion was obtained regardless of whether the metal surface was wet or dry at time of application.

TABLE I

*Outdoor exposure test*

| Test Duration, Days | Dry Panel Unprotected | Wet Panel Unprotected | Dry Panels Plus Composition | | Wet Panels Plus Composition | |
| --- | --- | --- | --- | --- | --- | --- |
| | | | Number 1 | Number 2 | Number 1 | Number 2 |
| 1 | Numerous spots of specks of rust. | 100% light rust | Clean | Clean | Clean | Clean. |
| 5 | 75% light rust | 100% moderate rust | do | do | Spots of rust | Same as No. 1. |
| 7 | 90% light rust | do | do | do | do | Do. |
| 14 | 100% light to moderate rust. | 100% moderate to heavy rust. | do | do | Numerous spots and streaks of rust. | Do. |
| 21 | 100% moderate to heavy rust. | 100% heavy rust | do | do | 75% light rust | Do. |
| 30 | 100% heavy rust | do | Spots of rust | Same as No. 1 | 90% light rust | 95% light rust. |
| Weight change | 80 mg. gain | 275 mg. gain | 5 mg. loss | 1 mg. gain | 8 mg. gain | 15 mg. gain. |

Continuous immersion of steel in water is a fairly severe rusting and corroding condition, but it is not as severe as a cycle of alternating periods of immersion in water followed by exposure to air. Consequently a cycle of this type was used to evaluate the protectivity of the composition.

A set of eight steel panels was first sandblasted and weighed. Four of the panels were dipped in the composition, but the other four panels received no protection. The eight panels were then immersed in synthetic sea water for one day followed by hanging in air for one day. This daily cycle was repeated for eight weeks. One protected and one unprotected panel were removed after the first, second, fourth and eighth week. When removed the panels were each washed in solvent to remove any composition, wire brushed to remove rust, dried, and then weighed to determine weight loss due to rust and corrosion. The results obtained are shown below in Table II.

TABLE II

*Cycling exposure test*

| Time | Weight Loss, Mgs. | |
| --- | --- | --- |
| | Protected | Unprotected |
| 1 week | 19 | 10 |
| 2 weeks | 38 | 208 |
| 4 weeks | 90 | 210 |
| 8 weeks | 4,331 | 7,839 |

It is evident that the composition afforded a considerable degree of protection in this severe test. After eight weeks the daily dunking in sea water had washed off a considerable amount of the composition, but the protected panel had still suffered only about half as much weight loss as the unprotected panel.

In general it appears that effective surface coating may be realized with any floating layer of the coating material of sufficient thickness which will inherently spread across the entire upper surface of the flooding water to contact the confining surfaces at its margins. Preferably, however, a thickness of at least 1/16 to 1/2 inch is advisable.

The rate of water level alteration within any practically attainable range does not appear to exert any material effect on the character of the resulting wall coating so long as the floating layer of coating materials, as above indicated, is sufficient to form a substantial uniform and unbroken stratum which makes contact with the interior tank surfaces at its margins. Sometimes several passes of the coating composition in a tank may be necessary to form an adequate film, this being accomplished by repeatedly raising and lowering the water level.

As also intimated, the present process results in the coating of interior tank structures of the tank such as ladders, gussets, frames, baffles and the like. It is also applicable to tanks in general which are subjected to contact with air and/or aqueous liquids.

The composition of the invention is also valuable even where the floating procedure cannot be employed, as for unenclosed metal structures. Spraying or brushing can be used in such cases.

Obviously, many modifications and variations of the invention as hereinbefore set forth, may be made without departing from the spirit and scope thereof, and therefore only such limitations should be imposed as are indicated in the appended claims.

I claim:

1. A method of inhibiting the corrosion of a ferrous metal body which comprises applying to and maintaining on the surface of such a body a fluent coating composition comprising an intimate mixture of tall oil, petroleum residuum from straight run distilling a naphthene base crude oil, said residuum having a Saybolt-Furol viscosity of 40–55 seconds at 210° F., and sufficient petroleum oil of lower viscosity than said residuum to cut back said residuum and form a composition having a Saybolt-Furol viscosity in the range of about 25 to 50 seconds at 122° F., said tall oil being present in an amount between about 1 and 5% of said composition.

2. A method for protecting the inner walls of a metal tank from corrosion which comprises introducing into said tank a fluent coating composition comprising an intimate mixture of tall oil, petroleum residuum from straight run distilling a naphthene base crude oil, said residuum having a Saybolt-Furol viscosity of 40–55 seconds at 210° F., and sufficient petroleum oil of lower viscosity than said residuum to cut back said residuum and form a composition having a Saybolt-Furol viscosity in the range of about 25 to 50 seconds at 122° F., said tall oil being present in an amount between about 1 and 5% of said composition; floating said coating composition upon the surface of a body of water in said tank as a uniform layer contacting the confining walls of said tank at its margins; and coating said confining walls with said coating composition by effecting relative movement between the surface of said body of water and said walls.

3. A method in accordance with claim 2 wherein said petroleum residuum constitutes about 33.3%, said petroleum oil constitutes about 63.8% and said tall oil constitutes about 2.9% of said composition.

4. A method in accordance with claim 2 wherein said petroleum oil has a viscosity of about 100–175 seconds Saybolt-Universal at 100° F.

5. A fluent coating composition having the property of floating on water and suitable for application by water flotation to the inner walls of a metal tank to protect said tank from corrosion, said composition consisting essentially of 1 to 5% of tall oil, residual oil from straight run distilling a naphthene base crude oil, said residual oil having a Saybolt-Furol viscosity of 40–55 seconds at 210° F., and sufficient petroleum oil of lower viscosity than said residual oil to cut back said residual oil and form a composition having a Saybolt-Furol viscosity in the range of about 25–50 seconds at 122° F.

6. A fluent coating composition in accordance with claim 5 wherein said residual oil constitutes about 33.3%, said petroleum oil constitutes about 63.8%, and said tall oil constitutes about 2.9% of said composition.

7. A fluent coating composition in accordance with claim 5 wherein said petroleum oil has a viscosity of about 100–175 seconds Saybolt-Universal at 100° F.

References Cited in the file of this patent

UNITED STATES PATENTS

| | | |
|---|---|---|
| 1,850,700 | Taylor | Mar. 22, 1932 |
| 2,286,244 | Whitacre | June 16, 1942 |